(12) United States Patent
Kimura et al.

(10) Patent No.: US 10,071,512 B2
(45) Date of Patent: Sep. 11, 2018

(54) METHOD FOR MANUFACTURING LIQUID-EJECTING HEAD

(71) Applicant: CANON KABUSHIKI KAISHA, Tokyo (JP)

(72) Inventors: Satoshi Kimura, Kawasaki (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 15/156,569

(22) Filed: May 17, 2016

(65) Prior Publication Data

US 2016/0346968 A1 Dec. 1, 2016

(30) Foreign Application Priority Data

May 25, 2015 (JP) ................. 2015-105134

(51) Int. Cl.
*B28B 7/22* (2006.01)
*B29C 45/00* (2006.01)
(Continued)

(52) U.S. Cl.
CPC ...... *B29C 45/0003* (2013.01); *B29C 45/1635* (2013.01); *B29D 22/003* (2013.01);
(Continued)

(58) Field of Classification Search
CPC .. B41J 2/14032; B41J 2/1404; B41J 2/14145; B41J 2002/14306; B41J 2/17513;
(Continued)

(56) References Cited

U.S. PATENT DOCUMENTS 6,648,454 B1 11/2003 Donaldson et al.
7,238,293 B2 7/2007 Donaldson et al.
(Continued)

FOREIGN PATENT DOCUMENTS

CN 101992601 A 3/2011
CN 102036823 A 4/2011
(Continued)

OTHER PUBLICATIONS

Extended European Search Report in European Application No. 16001152.4 (dated Sep. 30, 2016).
(Continued)

*Primary Examiner* — William P Bell
*Assistant Examiner* — Andrew L Swanson
(74) *Attorney, Agent, or Firm* — Fitzpatrick, Cella, Harper & Scinto

(57) ABSTRACT

Provided is a method for manufacturing a liquid-ejecting head whereby in die slide injection molding it is possible to stably inject resin in secondary molding without damaging the shapes of parts that were formed in primary molding. In order for that, in the connecting section in which a convex section of a cover member is inserted into an opening of a liquid-supply member, the closest distance to the opening in the area where secondary resin is injected is made larger than the gap between the opening and the convex section. As a result, the resin is prevented from flowing into a liquid path during the secondary molding.

11 Claims, 10 Drawing Sheets

(51) Int. Cl.
*B29C 45/16* (2006.01)
*B29D 22/00* (2006.01)
*B41J 2/14* (2006.01)
*B41J 2/01* (2006.01)
*B29L 31/00* (2006.01)

(52) U.S. Cl.
CPC ........ *B29C 45/006* (2013.01); *B29C 45/0062* (2013.01); *B29L 2031/7678* (2013.01); *B41J 2/01* (2013.01); *B41J 2/1404* (2013.01); *B41J 2/14032* (2013.01)

(58) Field of Classification Search
CPC .............. B41J 27/20; B29C 2045/0068; B29C 56/006; B29C 45/0062; B29C 45/0003; B29C 45/1635; B29C 2045/0663; B29C 2045/1637; B29D 22/003; B29L 2031/7678

See application file for complete search history.

(56) References Cited

U.S. PATENT DOCUMENTS

| | | |
|---|---|---|
| 8,251,496 B2 | 8/2012 | Hattori et al. |
| 8,329,086 B2 | 12/2012 | Kobayashi et al. |
| 2010/0171798 A1* | 7/2010 | Yamaguchi .......... B41J 2/16532 347/85 |

FOREIGN PATENT DOCUMENTS

| | | |
|---|---|---|
| JP | 59-089163 A | 5/1984 |
| JP | 2002-178538 A | 6/2002 |
| JP | 2002-321374 A | 11/2002 |
| JP | 2012-192749 A | 10/2012 |
| TW | 200406313 A | 5/2004 |

OTHER PUBLICATIONS

Amma et al., U.S. Appl. No. 15/156,583, filed May 17, 2016.
Oikawa et al., U.S. Appl. No. 15/151,880, filed May 11, 2016.
Iwano et al., U.S. Appl. No. 15/156,649, filed May 17, 2016.
Tsujiuchi et al., U.S. Appl. No. 15/157,909, filed May 18, 2016.
Iwano et al., U.S. Appl. No. 15/156,578, filed May 17, 2016.
Oikawa et al., U.S. Appl. No. 15/157,890, filed May 18, 2016.
Toda et al., U.S. Appl. No. 15/156,559, filed May 17, 2016.
First Office Action in Chinese Application No. 201610344114.7 (dated Jun. 11, 2018).

* cited by examiner

METHOD FOR MANUFACTURING LIQUID-EJECTING HEAD

BACKGROUND OF THE INVENTION

Field of the Invention

The present invention relates to a method for manufacturing a liquid-ejecting head for ejecting liquid like ink as drops.

Description of the Related Art

In a liquid-ejecting head that ejects liquid as drops for forming a photograph, a document, a 3-dimensional structure and the like, liquid paths for receiving the liquid from tubes or tanks and directing it to plural ejection elements are formed. For example, in the case of a color-inkjet printing head that receives plural inks and leads those inks to corresponding ejection elements, flow paths from the ink-supply openings to the ejection elements must be prepared independently for each color of ink. It is also necessary to have hollow internal construction in which the size of liquid chambers for temporarily storing the respective inks can be maintained to a certain extent, and that bends and surely guides each of the inks to ejection elements for each color that are arranged in a highly-dense narrow area. Therefore, in recent liquid-ejecting heads, that hollow internal construction has become complicated.

Typically, from the aspect of ease of manufacturing, lightness, and anti-corrosiveness, the flow paths of a liquid-ejecting head are often formed using a resin mold. In Japanese Patent Laid-Open No. 2002-178538, a method is disclosed whereby in primary molding, plural parts for achieving the kind of complicated internal construction described above are formed by injecting resin into different locations inside the same mold, and then in secondary molding, the plural parts are connected to each other and resin is injected again in the connecting areas to combine these parts together inside the same mold. Hereafter, this kind of manufacturing method will be called 'die slide injection molding'. By employing 'die slide injection molding', it is possible to manufacture molded parts having complicated internal structure with high precision and good efficiency.

However, as in recent years, when parts have complicated hollow construction as described above, there was a possibility that parts that were formed during the primary molding would become deformed due to pressure used for injecting resin during the secondary molding. Particularly, when a hollow area that was formed during the primary molding was located near the injection opening during the secondary molding, there was a possibility that resin would flow into that hollow area during the secondary molding and that the volume of that hollow area would be reduced. In a liquid-ejecting head, such hollow areas function as liquid paths that supply liquid to plural ejection elements. When the volume of a liquid path becomes less than the design value, or when the liquid path for only one particular color of ink is reduced, the effect also appears in the image, so the reliability of liquid-ejecting head also decreases.

SUMMARY OF THE INVENTION

The present invention was invented to solve the problems described above. Therefore, the object of the present invention is to provide a manufacturing method for a liquid-ejecting head whereby in die slide injection molding, the injection of resin during secondary molding can be performed stably without damaging the shape of parts that were formed in primary molding.

According to a first aspect of the present invention, there is provided a method for manufacturing a liquid-ejecting head that comprises an ejection-element section that ejects liquid and a liquid-supply section in which a liquid path for guiding the liquid to the ejection-element section is formed; wherein a main mold, and a die slide mold that can slide inside the main mold and in which a mold for forming a first part of the liquid-supply section and a mold for forming a second part of the liquid-supply section are arranged in a direction of the slide are prepared; the method including: a first molding process for forming the first part and the second part by injecting resin into the mold for forming the first part and into the mold for forming the second part with the main mold in a closed state; a sliding process for sliding the die slide mold and positioning and aligning the first part and the second part in the direction of the slide; and a second molding process for forming the liquid-supply section by bringing the first part and the second part into contact by inserting a convex section of the second part into an opening in the first part, and then injecting resin for connecting the first part and the second part together; wherein in the second molding process, a distance between an area where the resin is injected and the opening is larger than a distance between an inner wall surface of the opening and an outer wall surface of the convex section.

According to a second aspect of the present invention, there is provided a method for manufacturing a liquid-supply member that comprises a liquid path for supplying liquid, wherein a main mold, and a die slide mold that can slide inside the main mold and in which a mold for forming a first part of the liquid-supply member and a mold for forming a second part of the liquid-supply member are arranged in a direction of the slide are prepared; the method including a first molding process for forming the first part and the second part by injecting resin into the mold for forming the first part and into the mold for forming the second part with the main mold in a closed state; a sliding process for sliding the die slide mold and positioning and aligning the first part and the second part in the direction of the slide; and a second molding process for forming the liquid-supply member by bringing the first part and the second part into contact by inserting a convex section of the second part into an opening of the first part, and then injecting resin for connecting the first part and the second part together; wherein in the second molding process, a distance between an area where the resin is injected and the opening is larger than a distance between an inner wall surface of the opening and an outer wall surface of the convex section.

Further features of the present invention will become apparent from the following description of exemplary embodiments (with reference to the attached drawings).

DESCRIPTION OF THE EMBODIMENTS

Embodiment 1

Figure 1A:
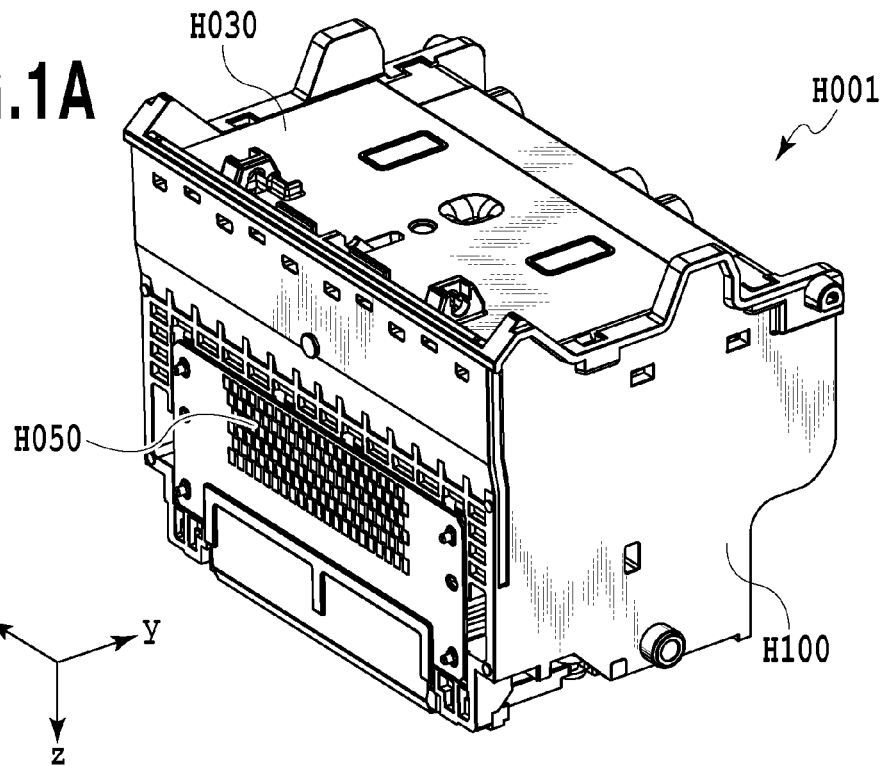
FIG. 1A and FIG. 1B are perspective views of a liquid-ejecting head.
Figure 1B:
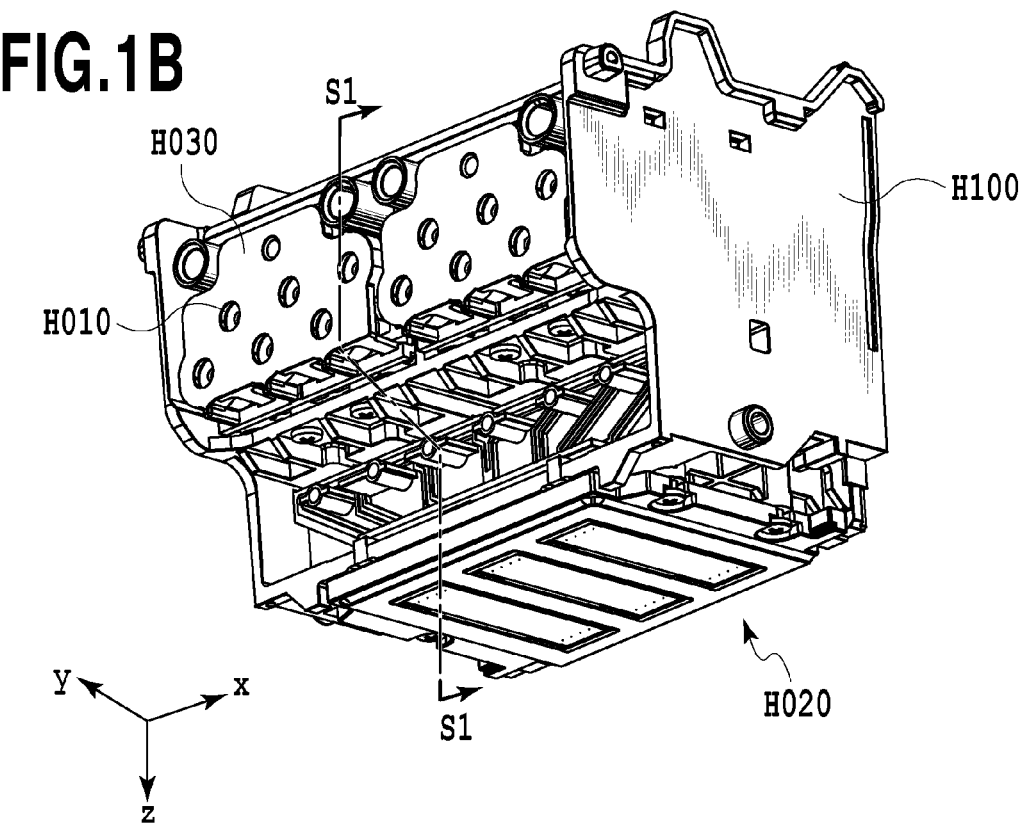

FIG. 1A and FIG. 1B are perspective views as seen from different angles of a liquid-ejecting head H001 that is used in this embodiment. The liquid-ejecting head H001 of this embodiment is a color-inkjet printing head for printing images by ejecting 12 colors of ink. Each color of ink is received into a sub-tank H030 by way of a tube that is connected to a supply opening H010. After that, the ink passes through a liquid-supply member H100 in which independent liquid paths are formed for each ink color, and is guided to an ejection-element unit H020. Plural ejection elements that correspond to each ink are arranged in a row in the ejection-element unit H020, and ejection signals are supplied from an electric connection board H050 based on image data. The individual ejection elements eject ink as drops in the Z direction according to the ejection signals.

Figure 2:
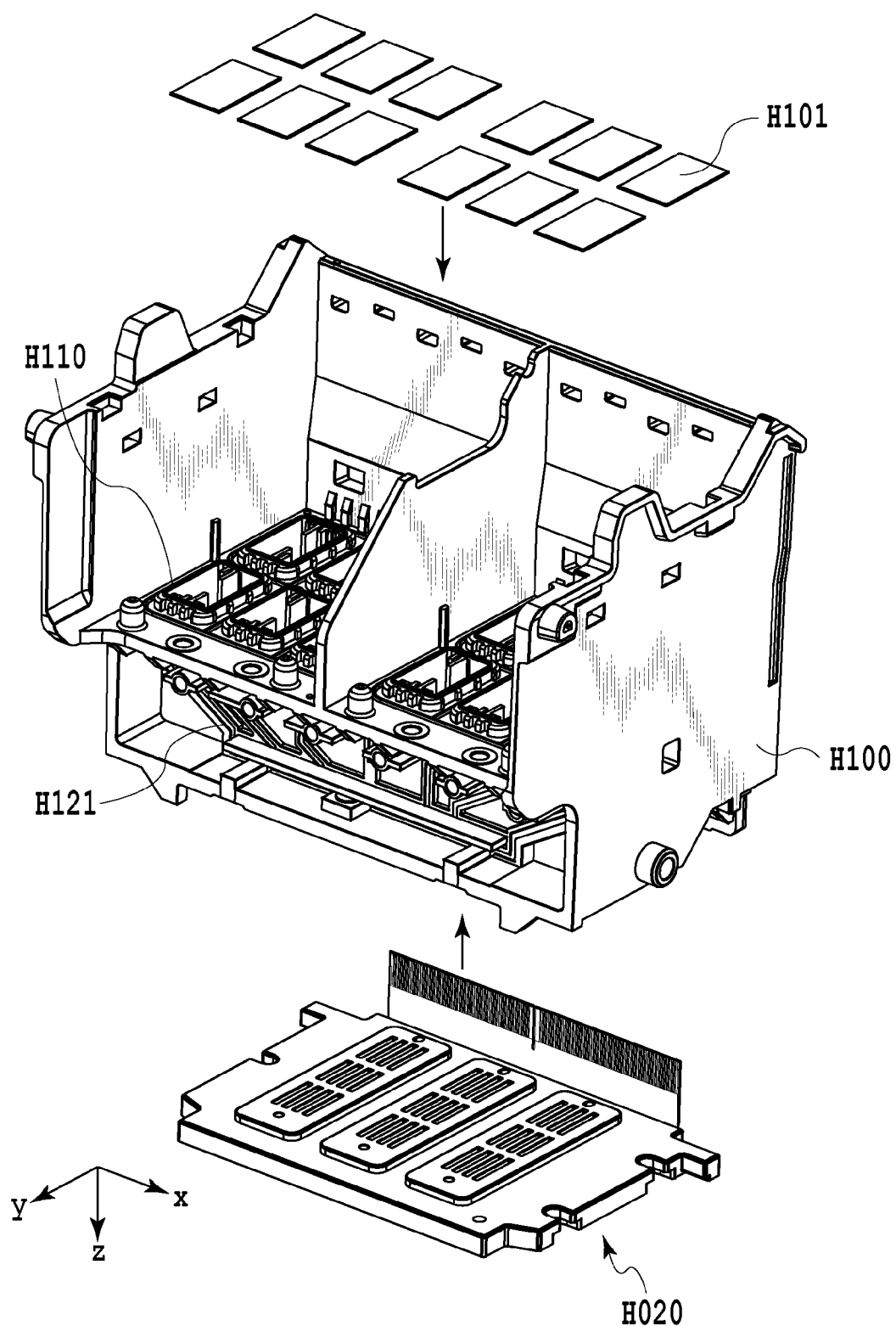
FIG. 2 is an exploded view of the liquid-supply member.

FIG. 2 is an exploded view of the liquid-supply member H100. In the liquid-supply member H100, filters H101 that correspond to individual storage chambers that correspond to the ink colors and that are used for removing foreign matter from the liquid are attached to positions that are connected to the sub-tank H030 in which the individual storage chambers are formed. A liquid chamber H110 is formed between the filters H101 and the ejection-element unit H020 for connecting the two together. Liquid paths having different amounts of bending and different lengths connect upper openings for connecting with the filters H101 and lower openings for connecting to the ejection-element unit H020 are individually formed in the liquid chamber H110 and correspond to the 12 ink colors. In this embodiment, the hollow internal construction of the liquid chamber H110 having such a complicated shape is formed by die slide injection molding.

Figure 3A:
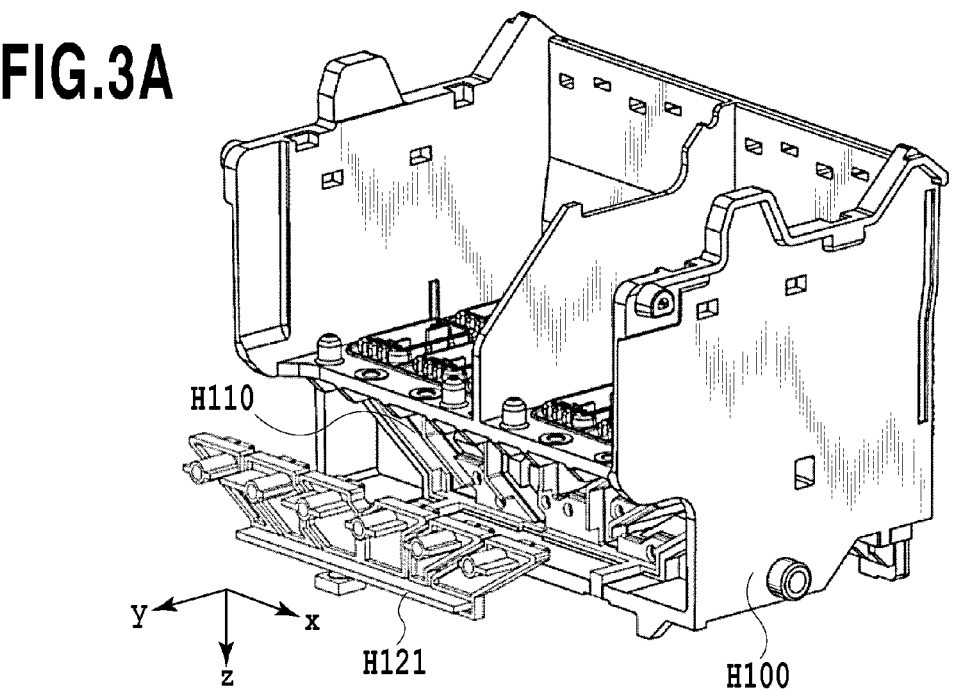
FIG. 3A and FIG. 3B are views illustrating two parts that are joined in secondary molding.
Figure 3B:
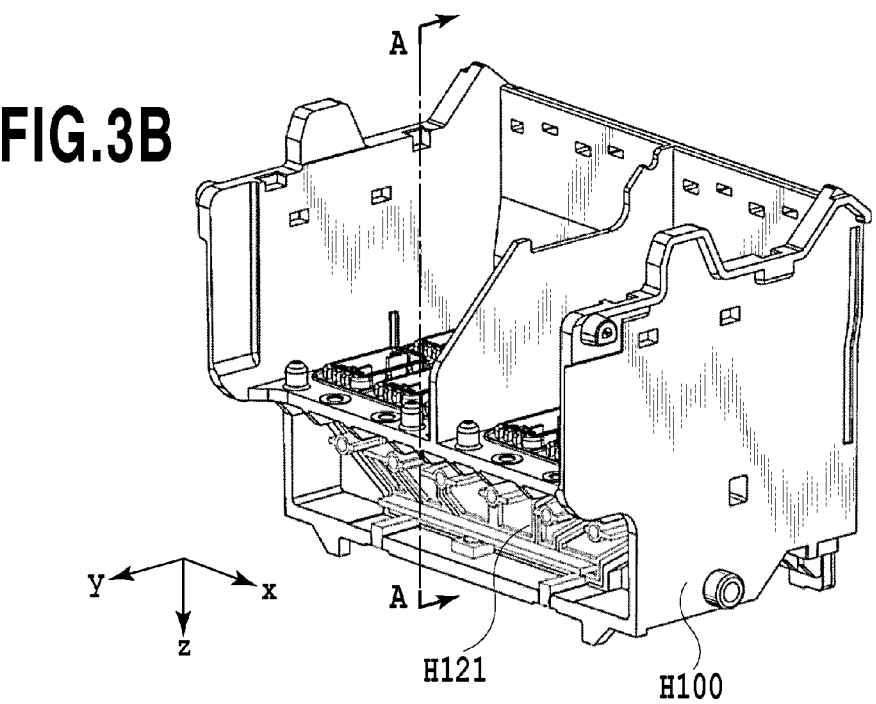

FIG. 3A and FIG. 3B are views illustrating two parts that are finally connected in die slide injection molding. In this embodiment, after a liquid-supply member H100 has been formed by molding as described above, a cover member H121 that has similarly been formed by molding is provided so as to face the liquid-supply member H100 from the +Y direction, and is connected as illustrated in FIG. 3B. After the liquid chamber H110 is completed by die slide injection molding, the ejection-element unit H020 and the filters H101 are attached to complete the liquid-supply member H100.

Figure 4:
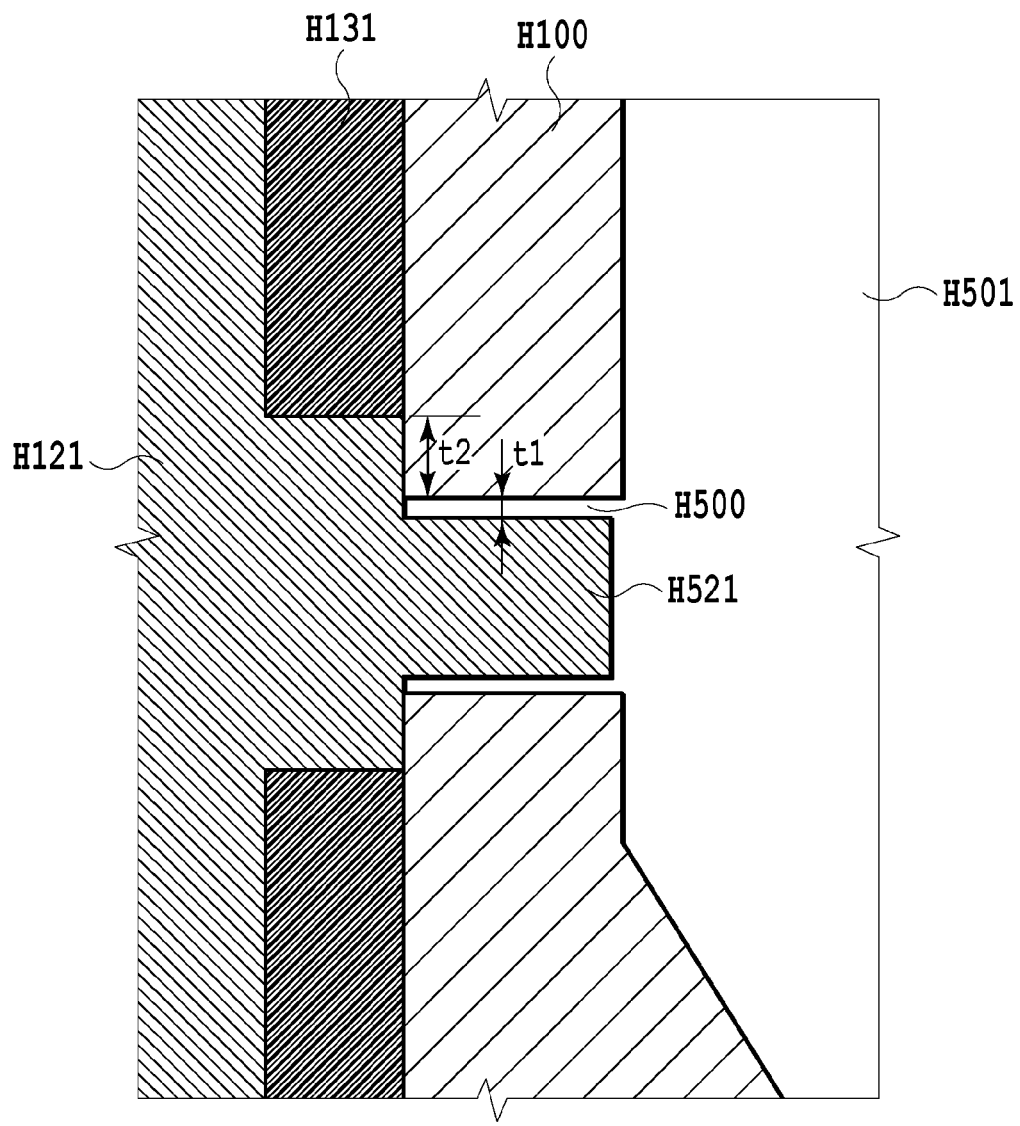
FIG. 4 is an enlarged cross-sectional view of the connection between a liquid chamber and a cover member.

FIG. 4 is an enlarged cross-sectional view of the connection between the liquid chamber H110 and the cover member H121. The two members are connected together by inserting a convex section H521 that is provided on the cover member H121 side into an opening H500 that is provided on the liquid-supply member H100 side. In order to achieve a secure connection, the cross-sectional area of the opening H500 is set to be just a little larger than the cross-sectional area of the convex section H521, and the design is such that a gap (distance) t1 is formed between an inner wall surface of the opening H500 and an outer wall surface of the convex section H521. Moreover, in order that the smoothness of the wall surface of the liquid path H501 is maintained, the tip end of the convex section H521 and the entrance of the opening H500 are arranged in nearly the same position in the Y direction.

In the secondary molding, with the liquid chamber H110 and the cover member H121 connected as illustrated in the figure, secondary resin that melts both the liquid chamber H110 and the cover member H121 is injected in the surrounding area. As a result, the secondary resin flows into a space H131 that was formed between the cover member H121 and the liquid-supply member H100, and both members are completely connected. When doing this, in this embodiment, the shortest distance t2 between the injection area of the secondary resin and the opening H500 is designed so as to be sufficiently larger than the gap t1 (t2>t1).

Figure 5:
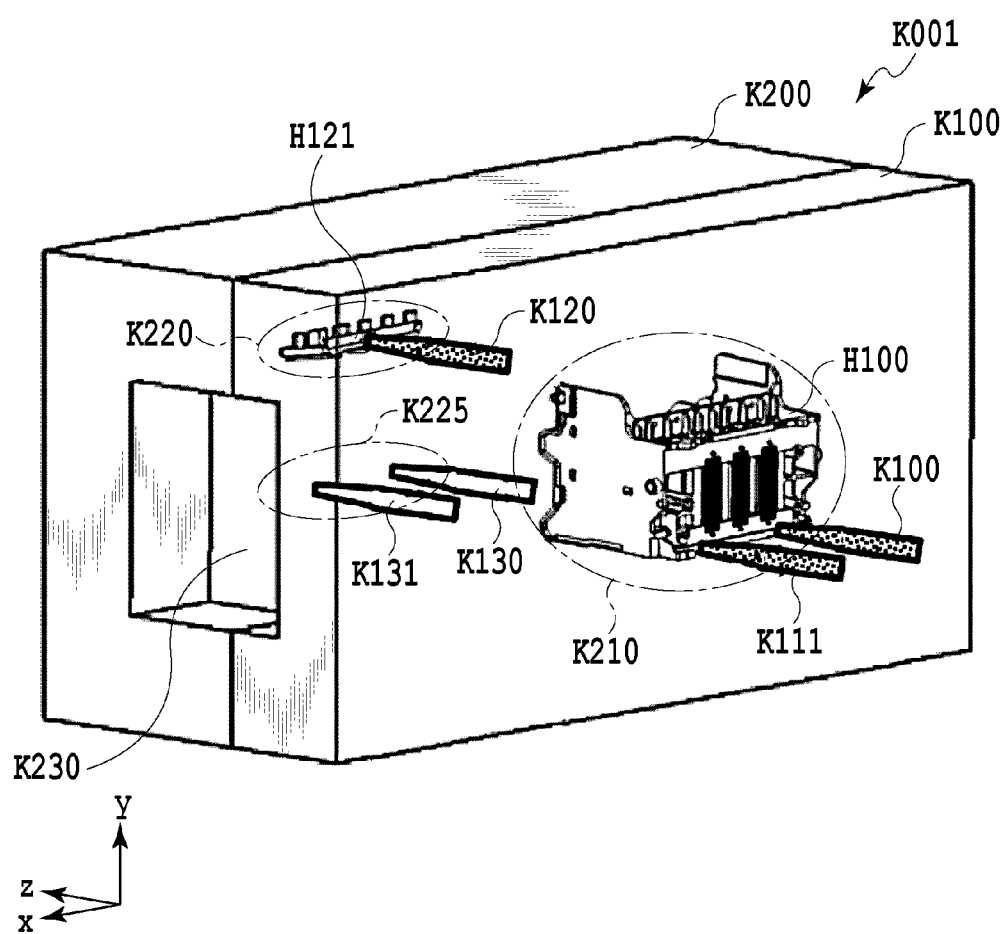
FIG. 5 is a view illustrating a mold for forming the liquid-supply member.

FIG. 5 is a view illustrating a mold for forming the liquid-supply member H100 by die slide injection molding. The main mold K001 that is used in this embodiment includes a stationary-side mold K100 and a movable-side mold K200 that can be separated in the Z direction. Further, a die slide mold K230 that is in the main mold K001 and can slide in the X direction with respect to the main mold K001 is provided belonging to the side of the movable-side mold K200. FIG. 5 illustrates the state of forming both the liquid-supply member H100 and the cover member H121 in primary molding. The liquid-supply member H100 is formed by injecting liquid resin through valve gates K110 and K111 at a first molding position K210 inside the mold. The cover member H121 is formed by injecting liquid resin through a valve gate K120 at a second molding position K220 inside the mold. Furthermore, the liquid-supply member H100 and the cover member H121 that are formed in the primary molding are connected by injecting liquid resin through valve gates K130 and K131 at a third molding position K225 inside the mold.

Figure 6A:
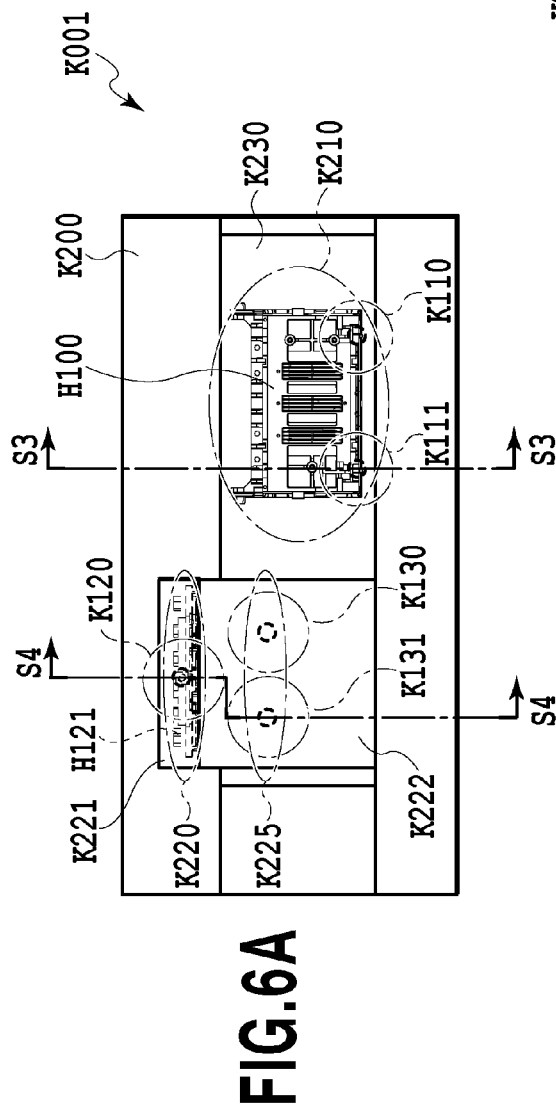
FIG. 6A to FIG. 6C are cross-sectional views of the mold for forming the liquid-supply member.
Figure 6B:
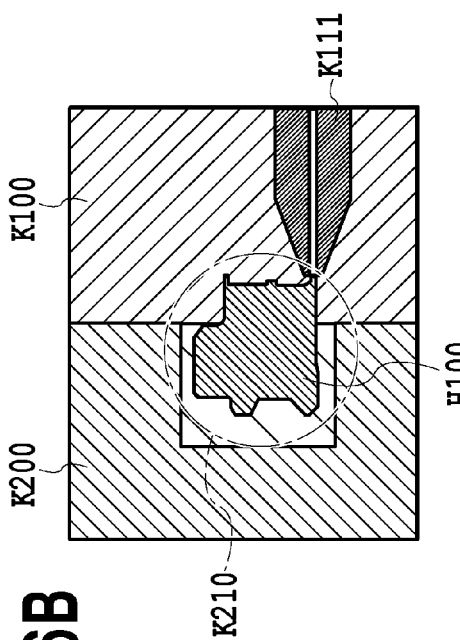
Figure 6C:
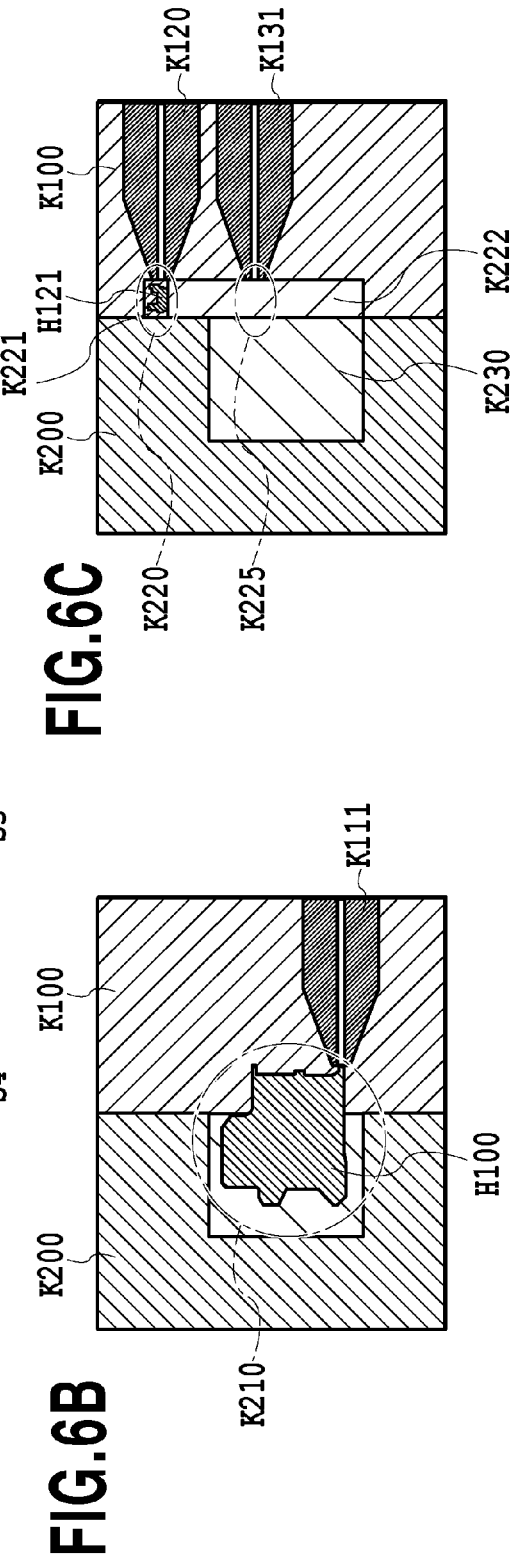

FIG. 6A to FIG. 6C are cross-sectional views of the main mold that is illustrated in FIG. 5. FIG. 6A is a transparent view of the mold illustrated in FIG. 5 as seen from the Z direction. FIG. 6B is a cross-sectional side view as seen from the −X direction when the mold is cut along a section S3-S3 in FIG. 5. FIG. 6C is a cross-sectional side view as seen from the −X direction when the mold is cut along a section S4-S4 in FIG. 5. Each of the valve gates K110, K111, K120, K130 and K131 is designed to inject a specified amount of liquid resin from its nozzle when correspondingly forming a part at a molding position with the main mold K001 in the closed state.

The valve gates K110, K111, K120, K130 and K131 of this embodiment are all of the same type, and each has a cross section as indicated by the dotted-line circle in the figure. Therefore, adjacent valve gates must be arranged at a distance that is as least equal to or greater than the diameter of the dotted-line circle, and the second molding position K220 and third molding position K225 that are in the same position in the X direction are provided in positions that are shifted in the Y direction.

FIG. 7A to FIG. 7C and FIG. 8A to FIG. 8C are views illustrating the die slide injection molding process for forming the liquid chamber H110. These figures are transparent views of the mold illustrated in FIG. 5 as seen from the Z direction.

Figure 7A:
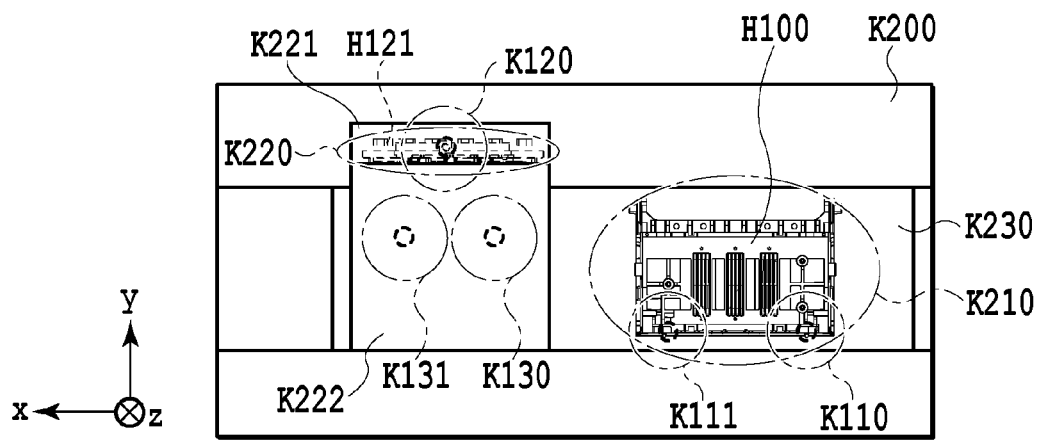
FIG. 7A to FIG. 7C are views illustrating steps for forming the liquid-supply member.

In a first step, with the stationary-side mold K100 and the movable-side mold K200 closed, the resin is flowed from the valve gates K110, K111 that correspond the first molding position K210, and from the valve gate K120 that corresponds to the second molding position K220. As a result, the liquid-supply member H100 and the cover member H121 are formed at the first molding position K210 and at the second molding position K220 respectively, inside the mold K001 as illustrated in FIG. 7A. In this embodiment, this first step corresponds to a first molding process.

In a second step, the movable-side mold K200 is moved in the +Z direction with respect to the stationary-side mold K100, and the two molds are separated. In this second step of this embodiment, both the liquid-supply member H100 and the cover member H121 are taken to belong to the die slide mold K230, or in other words, the movable-side mold K200.

Figure 7B:
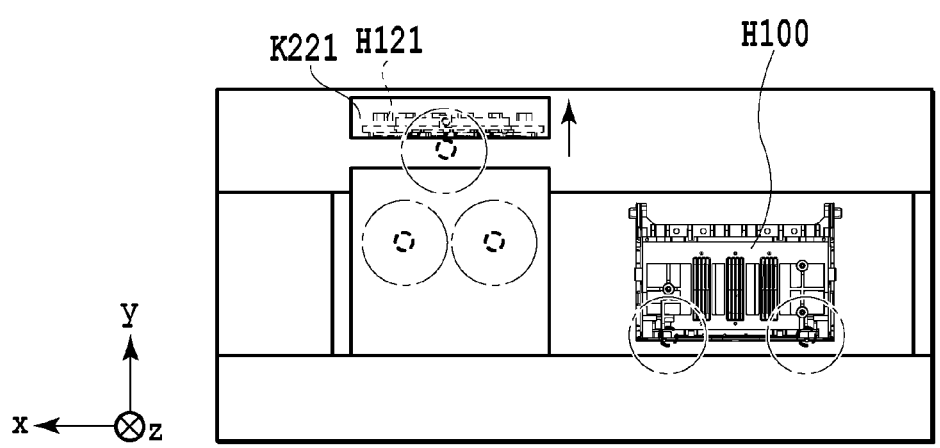

In a third step, as illustrated in FIG. 7B, the cover member H121 is moved in the +Y direction together with a part-sliding piece K221 that forms one side of the cover member H121. At the second molding position K220, a mold for forming the cover member H121 is such that the surface of the one side includes the die-slide mold K230, and the surface of the other side includes the part-sliding piece K221. In this embodiment, when the part-sliding piece K221 is moved in the +Y direction, the cover member H121 that belongs to that piece also moves in the +Y direction. The movement of the part-sliding piece K221 is performed by a driving source (for example, a hydraulic cylinder) that is different than that for moving the movable-side mold K200 in the Y direction as described above.

Figure 7C:
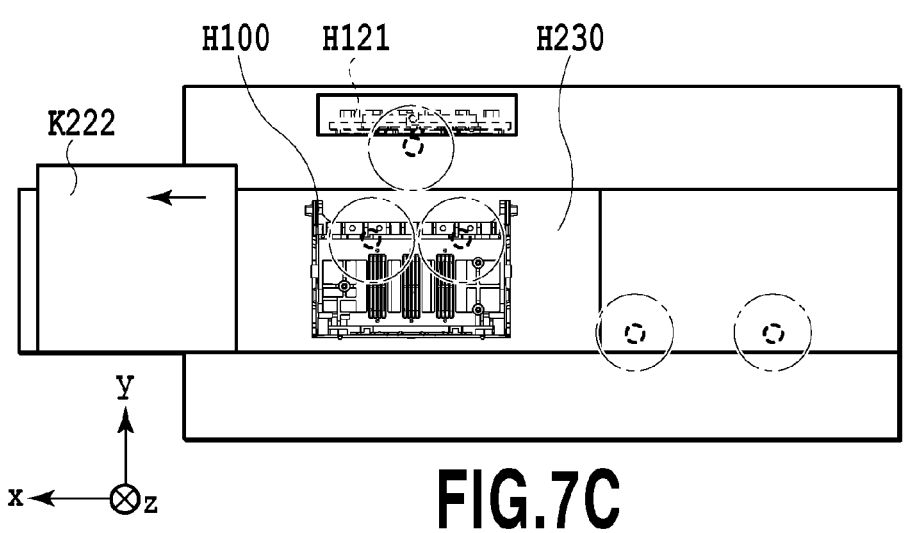

In a fourth step, as can be seen in FIG. 7C, the die-slide mold K230 that is arranged inside the movable-side mold K200 is moved in the +X direction, and the liquid-supply member H100 and the cover member H121 are positioned and aligned in the X direction. As in the case of the part-sliding piece K221, the driving source for moving the die slide mold K230 is different than that for moving the movable-side mold K200.

Figure 8A:
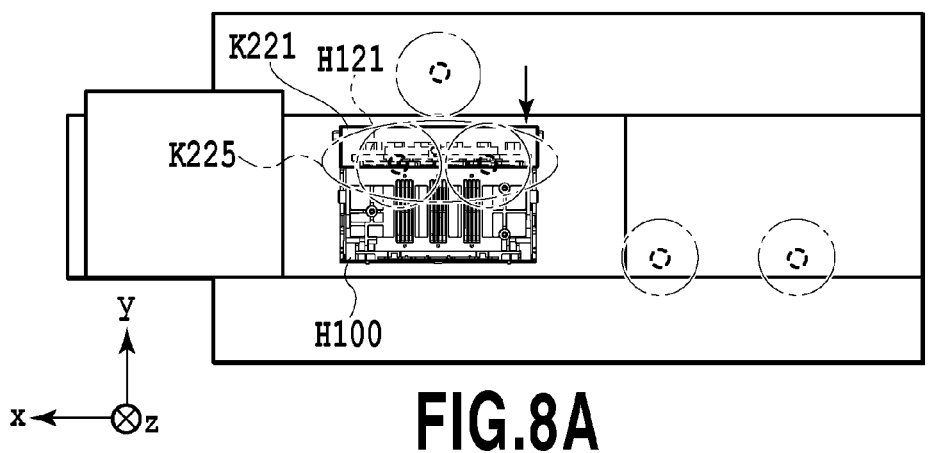
FIG. 8A to FIG. 8C are views illustrating steps for forming the liquid-supply member.

In a fifth step, as can be seen in FIG. 8A, the part-sliding piece K221 is moved in the −Y direction to the third molding position K225, and the cover member H121 is brought into contact at a specified position of the liquid-supply member H100. As can be seen from FIG. 3A and FIG. 3B already explained above, the cover member H121 of this embodiment is assembled in a secluded position with respect to the width area in the Y direction of the liquid-supply member H100. Therefore, it is possible to prevent collisions between the two members in the fourth step by, after the cover member H121 has been moved out of the way in the +Y direction to a retreat position in the third step, and positioning and alignment of the liquid-supply member H100 has been performed in the fourth step, moving the cover member H121 back in the −Y direction in the fifth step. In this kind of fifth step, the position to where the part-sliding piece K221 moves is shifted further in the −Y direction than the position where the primary molding of the cover member H121 was performed in the first step. In other words, the part-sliding piece K221 of this embodiment is able to move to three positions: the second molding position K220, the retreat position, and the third molding position.

Figure 8B:
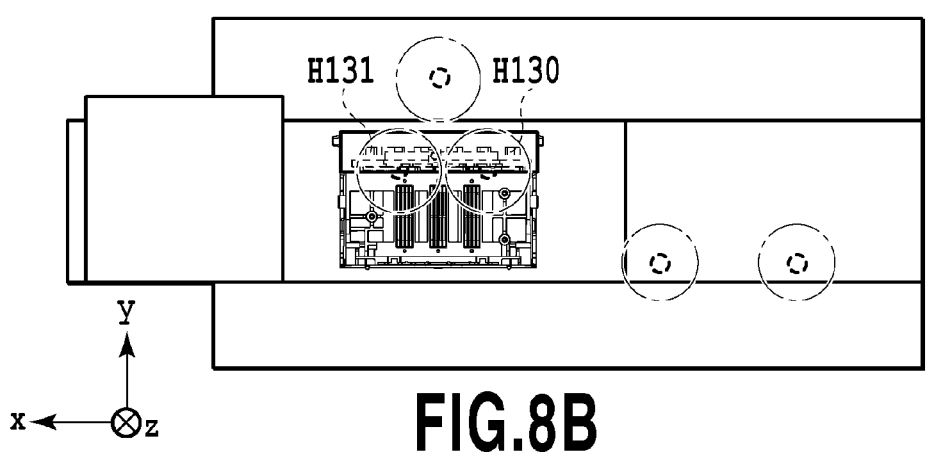
Figure 8C:
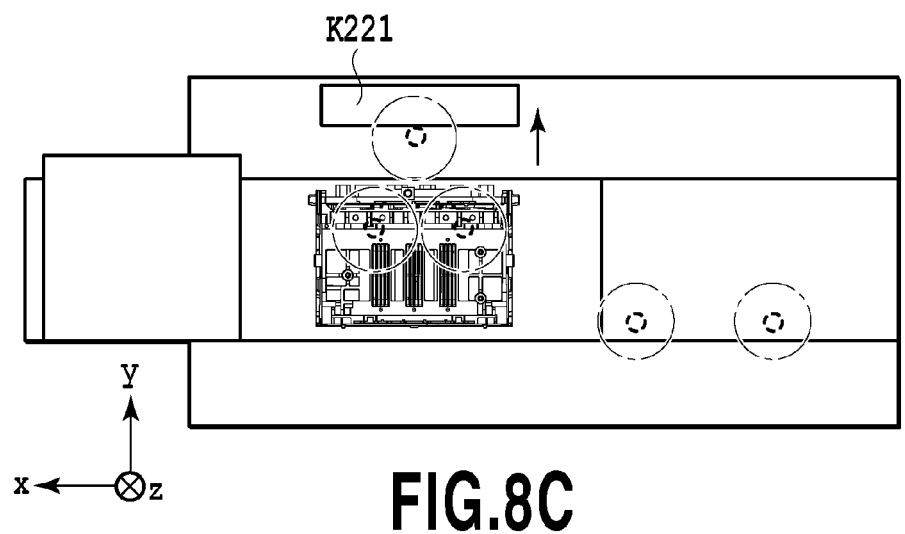

In a sixth step, the movable-side mold K200 is moved in the −Z direction, and becomes closed with the stationary-side mold K100. Then in this state, the resin that is compatible with both the liquid-supply member H100 and the cover member H121 is flowed from the valve gates K130, K131 to the third molding position for connecting together the liquid-supply member H100 and the cover member H121 as illustrated in FIG. 8B. In this embodiment, this sixth step corresponds to a secondary molding process.

In a seventh step, the main mold K001 is opened, the part-sliding piece K221 is moved out of the way in the +Y direction to the retreat position, and the completed liquid-supply member H100 having a sealed hollow structure is pressed in the −Z direction. As a result, the liquid-supply member H100 and the cover member H121 are connected, and the completed liquid-supply member H100 is obtained.

In the primary molding process and the secondary molding process, in order to flow the resin to each of the corners of the molds and to form parts having complicated construction, injecting the liquid resin at a somewhat high pressure through the valve gates with the mold K001 closed is preferred. When doing this, when the resin for the secondary molding is injected at high pressure in the area around the thin-walled complicated parts that were already formed in the primary molding, there is a possibility that the parts formed in the primary molding will deform, or that the resin will flow into the hollow spaces formed in the primary molding.

For example, referring again to FIG. 4, when the distance t2 is less than the gap t1, there is a possibility that due to the pressure when injecting the secondary resin, the secondary resin may pass through the gap t1 and enter into the liquid path H501 of the liquid-supply member H100. Particularly, when a series of steps is performed with the −Y direction being the direction of gravity as illustrated in FIG. 5, the liquid resin flowed in the secondary molding process can easily pass through the gap between the opening H500 and the convex section H521 due to gravity, and reach the liquid path H501. When such a condition occurs, the volume of the liquid path H501 decreases, and when used as a liquid-ejecting head, it is not possible to sufficiently perform the role of supplying liquid. By making the distance t2 sufficiently larger than the gap t1 as in this embodiment, even when the convex section H521 comes into contact with one of the inner walls of the opening H500 due to the injection pressure, the space H131 does not expand to the opening H500, and the distance between the both is sufficiently maintained. Therefore, even when the resin for secondary molding is injected and flowed with somewhat high pressure, the resin does not reach the gap t1, and it becomes possible to stably manufacture a highly reliable liquid-ejecting head.

Moreover, the wall thickness of the liquid-supply member H100 and the length of the convex section H521 of the cover member H121 are nearly the same, and have a sufficient size for securing the both. Therefore, even in the case that the secondary resin flows into the space H131 between the wall of the liquid-supply member H100 and the cover member H121 at somewhat high pressure, there is fluid resistance due to the thickness of the wall of the liquid-supply member H100, and it is possible to prevent deformation of the liquid-supply member H100.

Other Embodiments

Figure 9A:
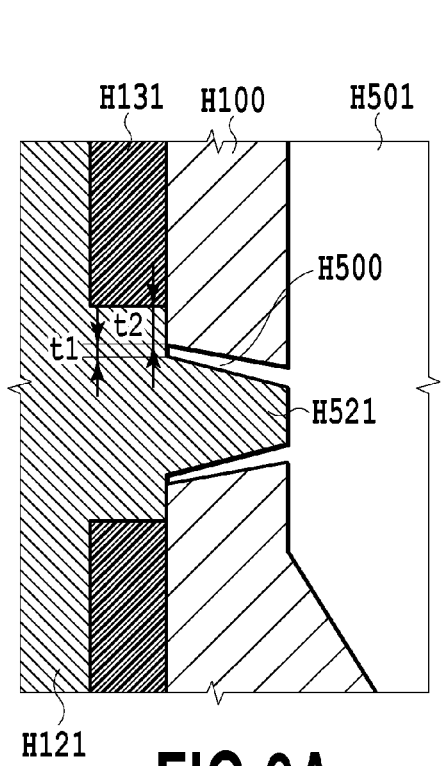
FIG. 9A to FIG. 9D are views illustrating another form of a connecting section between a liquid-supply member and a cover member.
Figure 9B:
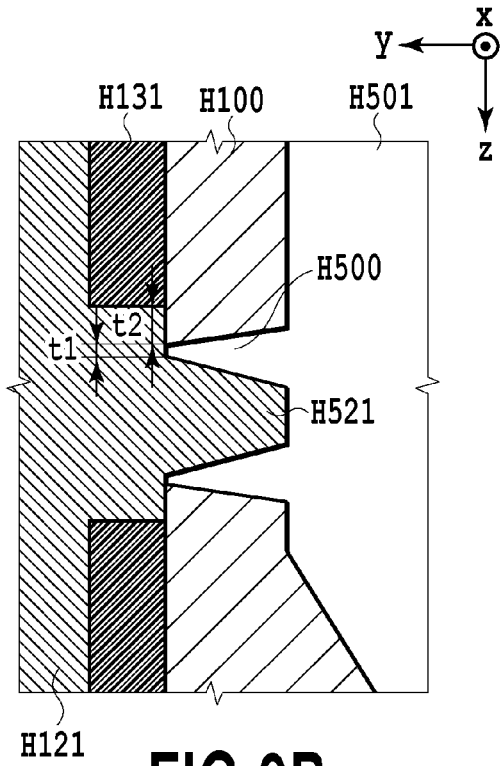

FIG. 9A to FIG. 9D illustrate other forms of a connecting section between the liquid-supply member H100 and the cover member H121 to which the present invention can be applied. In the embodiment above, as illustrated in FIG. 4, the wall surface of the opening H500 that is provided in the liquid-supply member H100 and the wall surface of the convex section H521 of the cover member H121 are parallel with the Y direction. However, the opening H500 and the convex section H521 in FIG. 9A and FIG. 9B for example are inclined with respect to the Y direction. FIG. 9A illustrates the case when the opening H500 and the convex section H521 are inclined in the same direction, and FIG. 9B illustrates the case when the two are inclined in different directions.

When such an incline (taper) is formed, the direction in which the mold used for forming the parts is removed in the step 2 after the primary molding is limited according to the direction of the incline of the taper. For example, in the case of FIG. 9A, the mold used in the primary molding for forming the liquid-supply member H100 can only be removed in the +Y direction. Therefore, when opening the main mold in the second step, the liquid-supply member H100 belongs to the side of the stationary-side mold K100 and is separated from the die slide mold K230. On the other hand, in the case of FIG. 9B, the mold that is used in the primary molding for forming the liquid-supply member H100 can only be removed in the −Y direction. Therefore, when opening the main mold in the second step, the liquid-supply member H100 belongs to the die slide mold K230 and is separated from the stationary-side mold K100 in the same way as in the embodiment above. In either case, the cover member H121 belongs to the side of the die slide mold K230 as in the embodiment above.

Figure 9C:
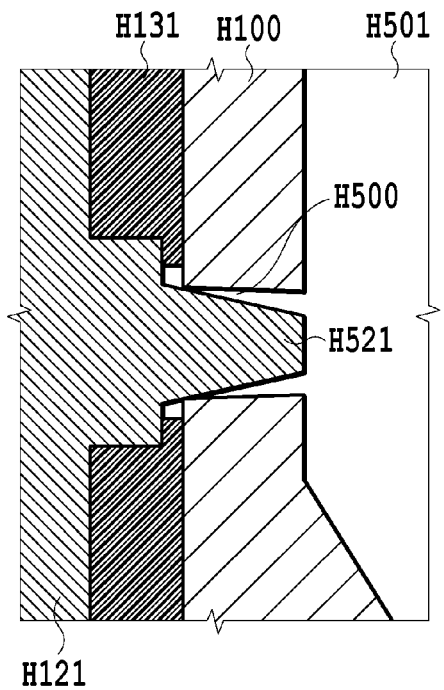

When comparing both cases, the case of FIG. 9A where the area of the opening is large during insertion could be said to make insertion of the cover member H121 into the opening H500 easy. In this case, as illustrated in FIG. 9C, construction is also possible in which the tapered shape of the convex section H521 is used and the edge of the opening H500 is brought into contact with the side surface of the convex section H521. By bringing the both members into direct contact as illustrated in FIG. 9C, it is possible to suppress movement and deformation due to resistance force that is received from the edge of the opening H500 even when the cover member H121 receives the fluid pressure of the secondary resin. Moreover, t1 essentially becomes 0, and the path to the liquid path H501 is completely sealed, so it is possible to more completely prevent the flow of the secondary resin.

Figure 9D:
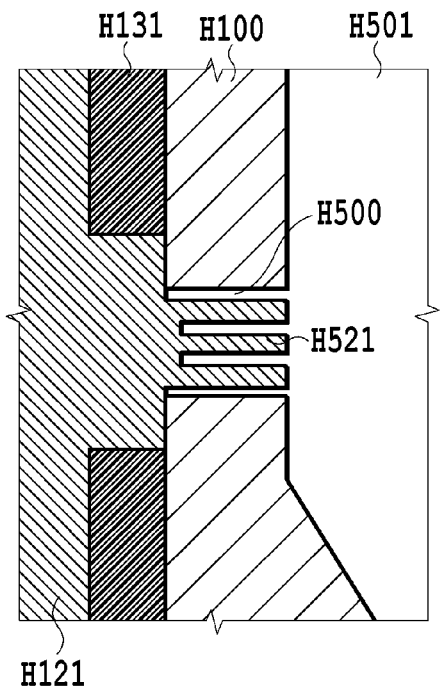

As even another form, it is possible to form grooves in the convex section as illustrated in FIG. 9D. By preparing such grooves, improvement of the liquid filling characteristics, or durability during liquid supply at the opening H500 can be expected.

In any of the forms illustrated in FIG. 9A to FIG. 9D, the relationship t2>t1 is satisfied as in the embodiment described above. Therefore, even when the secondary resin is flowed under high pressure during the secondary molding, the resin does not penetrate into the liquid path H501.

The gap t1 is opened into the liquid path H501, so when the gap t1 is too large, air bubbles or the like may occur in it and affect the performance of supplying liquid to the liquid path H501. Therefore, preferably the gap t1 is designed as small as possible but not obstruct the process of inserting the cover member H121.

Moreover, in the embodiment described above, the five valve gates of the same form were used as illustrated in FIGS. 6A to 6C, however, of course the present invention is not limited to such a form. It is also possible to perform all of the molding using the same single valve gate, or it is also possible to prepare a valve gate having a different form for injecting different resins in the primary molding and secondary molding. It is also possible to use three or more valve gates having the same form or different forms for one part according to the amount of liquid injected, and the volume and shape of the molded part.

Figure 10:
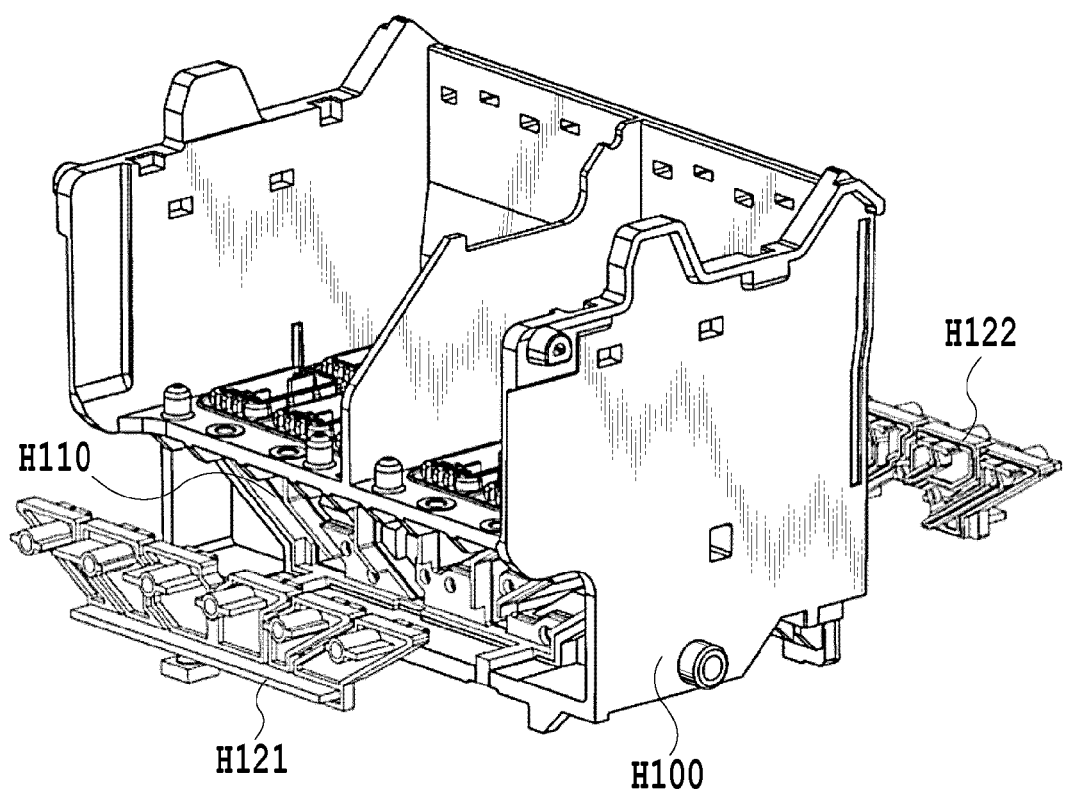
FIG. 10 is a view illustrating the connection between three parts in secondary molding.

Furthermore, above, as illustrated in FIG. 3A and FIG. 3B, the case of connecting the two parts that were formed in the primary molding in the secondary molding was explained, however, the number of parts could be more than two. For example, as illustrated in FIG. 10, the liquid chamber H110 can also be completed by bringing two cover members H121 and H122 in contact with the liquid-storage member H100 so as to face from the +Y direction and −Y direction. In this case, in the third step, a second mold piece is moved out of the away in the −Y direction opposite from the mold piece K221 described above, and in the fifth step, that mold piece is moved in the +Y direction so that the cover member comes into contact with the −Y direction side of the liquid chamber H110.

With the present invention described above, in the connecting section between the liquid-supply member H100 and cover member H121, the closest distance t2 to the opening section of the flow area of the secondary resin is larger than the gap t1 between the opening and the convex section, it is possible to prevent resin from flowing into the liquid chamber during secondary molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105134, filed May 25, 2015, which is hereby incorporated by reference wherein in its entirety.

What is claimed is:

1. A method for manufacturing a liquid-ejecting head that comprises an ejection-element section that ejects liquid and a liquid-supply section in which a liquid path for guiding the liquid to the ejection-element section is formed; wherein
  a main mold, and a die slide mold that can slide inside the main mold and in which a mold for forming a first part of the liquid-supply section and a mold for forming a second part of the liquid-supply section are arranged in a direction of the slide are prepared;
  the method including:
  a first molding process for forming the first part and the second part by injecting resin into the mold for forming the first part and into the mold for forming the second part with the main mold in a closed state;
  a sliding process for sliding the die slide mold and positioning and aligning the first part and the second part in the direction of the slide; and
  a second molding process for forming the liquid-supply section by bringing the first part and the second part into contact by inserting a convex section of the second part into an opening in the first part, and then injecting resin for connecting the first part and the second part together; wherein
  in the second molding process, a distance between an area where the resin is injected and the opening is larger than a distance between an inner wall surface of the opening and an outer wall surface of the convex section.

2. The method for manufacturing a liquid-ejecting head according to claim 1, wherein the inner wall surface of the opening and the outer wall surface of the convex section are parallel in a direction of the insertion.

3. The method for manufacturing a liquid-ejecting head according to claim 1, wherein the inner wall surface of the opening and the outer wall surface of the convex section are inclined with respect to a direction of the insertion.

4. The method for manufacturing a liquid-ejecting head according to claim 3, wherein a direction of the inclination of the inner wall surface of the opening, and a direction of the inclination of the outer wall surface of the convex section are a same direction with respect to the direction of the insertion.

5. The method for manufacturing a liquid-ejecting head according to claim 3, wherein a direction of the inclination of the inner wall surface of the opening, and a direction of the inclination of the outer wall surface of the convex section are different directions with respect to the direction of the insertion.

6. The method for manufacturing a liquid-ejecting head according to claim 3, wherein the convex section is in contact with an edge of the opening.

7. The method for manufacturing a liquid-ejecting head according to claim 1, wherein grooves are formed in the convex section.

8. The method for manufacturing a liquid-ejecting head according to claim 1, wherein a tip end of the convex section and an entrance of the opening are arranged at nearly a same position in a direction of the insertion.

9. The method for manufacturing a liquid-ejecting head according to claim 1, wherein a direction of the insertion is in a direction of gravity.

10. The method for manufacturing a liquid-ejecting head according to claim 1, wherein a wall thickness of the first part and a length of the convex section of the second part in a direction of the insertion are equal.

11. A method for manufacturing a liquid-supply member that comprises a liquid path for supplying liquid, wherein
a main mold, and a die slide mold that can slide inside the main mold and in which a mold for forming a first part of the liquid-supply member and a mold for forming a second part of the liquid-supply member are arranged in a direction of the slide are prepared;
the method including:
a first molding process for forming the first part and the second part by injecting resin into the mold for forming the first part and into the mold for forming the second part with the main mold in a closed state;
a sliding process for sliding the die slide mold and positioning and aligning the first part and the second part in the direction of the slide; and
a second molding process for forming the liquid-supply member by bringing the first part and the second part into contact by inserting a convex section of the second part into an opening of the first part, and then injecting resin for connecting the first part and the second part together; wherein
in the second molding process, a distance between an area where the resin is injected and the opening is larger than a distance between an inner wall surface of the opening and an outer wall surface of the convex section.

* * * * *